United States Patent [19]
Slimp, Jr.

[11] 3,899,929
[45] Aug. 19, 1975

[54] APPARATUS FOR INDICATING WIND DIRECTIONS AND VELOCITY

[76] Inventor: Jack B. Slimp, Jr., 8700 Artillery Rd., Manassas, Va. 22110

[22] Filed: Mar. 18, 1974

[21] Appl. No.: 452,219

[52] U.S. Cl. ................................................. 73/189
[51] Int. Cl. ............................................ G01w 1/02
[58] Field of Search .............................. 73/189, 188

[56] References Cited
UNITED STATES PATENTS
1,359,406  11/1920  McCarty ............................. 73/188
1,450,278  4/1923   Cave .................................. 73/189

FOREIGN PATENTS OR APPLICATIONS
30,767  11/1931  Australia ............................ 73/189

Primary Examiner—Jerry W. Myracle
Assistant Examiner—Anthony V. Ciarlante
Attorney, Agent, or Firm—Mason, Mason & Albright

[57] ABSTRACT

An apparatus for indicating direction and velocity of the wind wherein a bar, supported somewhat off its center of gravity is mounted so it can both rotate 360 degrees about a vertical axis and tilt somewhat over 45 degrees from the horizontal. At each end of the bar a miniature or model airplane is mounted which can also pivot relative to the bar within limits. The model airplane on the heavier portion of the bar creates more drag than that of the forward airplane and also its elevator and ailerons are adjusted so that the model airplane at the rear tends to fly upwardly. In contrast, the model airplane on the forward end of the bar has less lift than the rear model airplane or, if desired, a negative lift with its elevator disposed whereby the forward airplane tends to fly downwardly or to dive. Both airplanes point in the same direction and dispose themselves and the bar into the wind due to the somewhat greater drag on the after airplane. When the wind is minimal, the rear portion of the bar is inclined downwardly whereas the forward portion is inclined upwardly. However, as the wind velocity increases, the after airplane rises whereas the forward airplane descends in altitude. In a strong wind with high velocity, the bar is tilted with the forward end down and the rearward portion of the bar upwardly whereas the rear airplane is at a higher level than the forward airplane. Both model airplanes are permitted to pivot within limits relative to the bar and the after airplane is mounted on a depending rod. A propeller is provided for each model airplane which although primarily for appearance purposes, nevertheless lends a certain amount of stabilization to the model aircraft.

19 Claims, 6 Drawing Figures

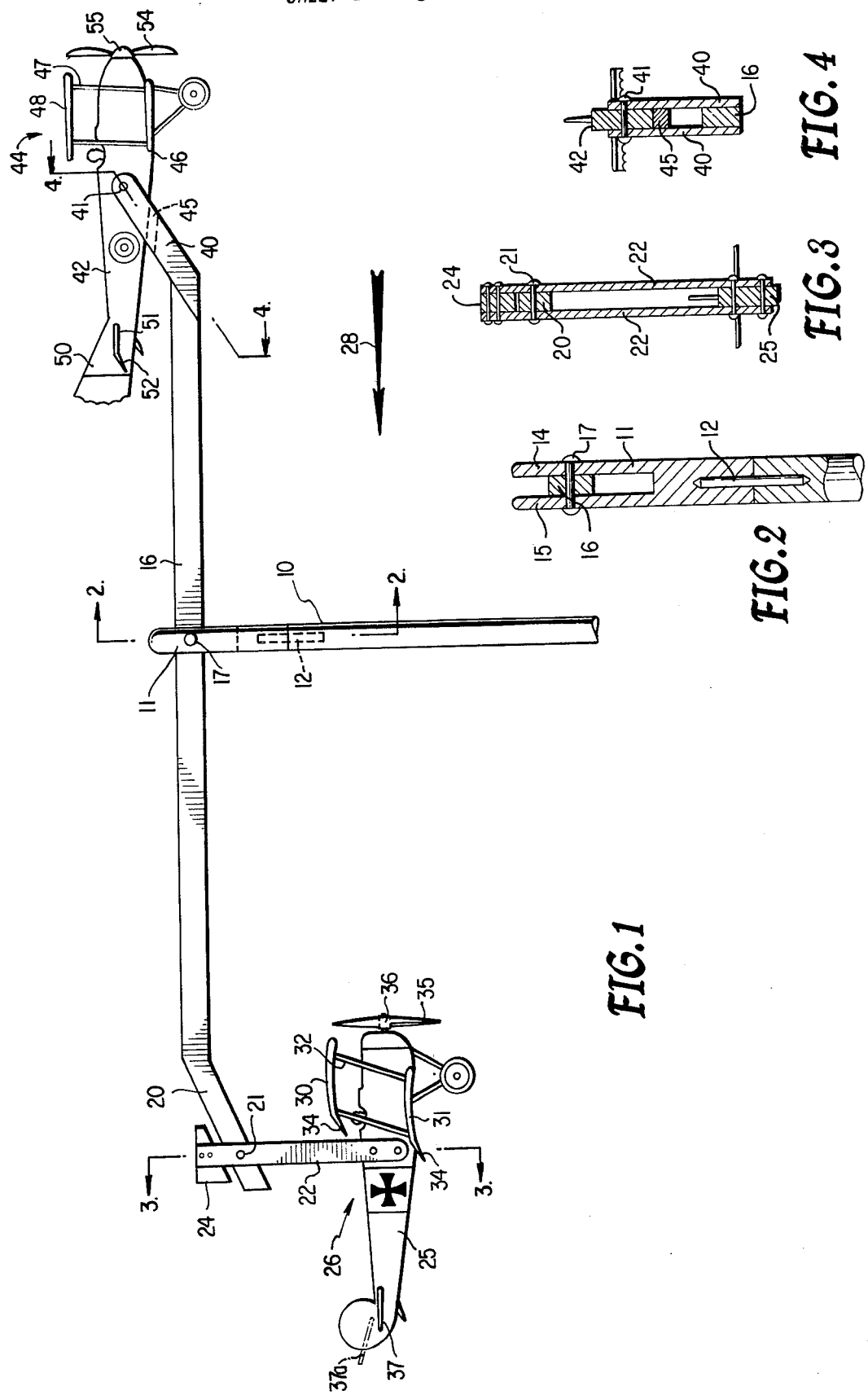

APPARATUS FOR INDICATING WIND DIRECTIONS AND VELOCITY

SUMMARY OF THE INVENTION

The invention is a wind vane adapted to indicate the velocity and direction of the wind. More particularly, it is an apparatus of this type which utilizes the relative lift of a pair of model airplanes to indicate the relative velocity of the wind.

Devices which indicate the relative wind velocity and which utilize for such purpose the lift of model or miniature aircraft are known. The more usual device of this type involves a model airplane which rises against a resilient member whereby the velocity is indicated by the height the model attains. Such devices may or may not be combined with the apparatus to show the relative direction of the wind.

Similar devices frequently fail to indicate the relative velocity of the wind to a person viewing the device from a distance inasmuch as it is often difficult to determine from afar the amount the aircraft has lifted. It has occurred to the inventor that this problem can be overcome by placing two model airplanes on a bar which is pivoted somewhat off its center of gravity so that the relative velocity of the wind is apparent by noting the relative height of the two model airplanes involved. Also, by locating one of the model airplanes forward and the other rearwardly on the bar, with the greater drag in the rear, the relative direction of the wind is also immediately discernible. In addition, inasmuch as it appears that one model airplane is in effect chasing the other, the invention has certain entertainment value. In fact, the support for the bar can include a handle whereby it may be used as a toy to be held in the wind or a relative wind may be created by moving the bar.

The foregoing and other objects, adaptabilities and capabilities of the invention will be recognized as the description progresses, reference being had to the accompanying drawings, in which:

BRIEF DESCRIPTION OF THE DRAWINGS

FIG. 1 is a side elevation of the device with the bar in a horizontal position;

FIG. 2 is a fragmentary view illustrating the rotatable support and pivot arrangement for the bar;

FIG. 3 is a sectional view taken on section lines 3-3 of FIG. 1;

FIG. 4 is a sectional view taken on lines 4-4 of FIG. 1;

DESCRIPTION OF THE PREFERRED EMBODIMENT

Figure 5:
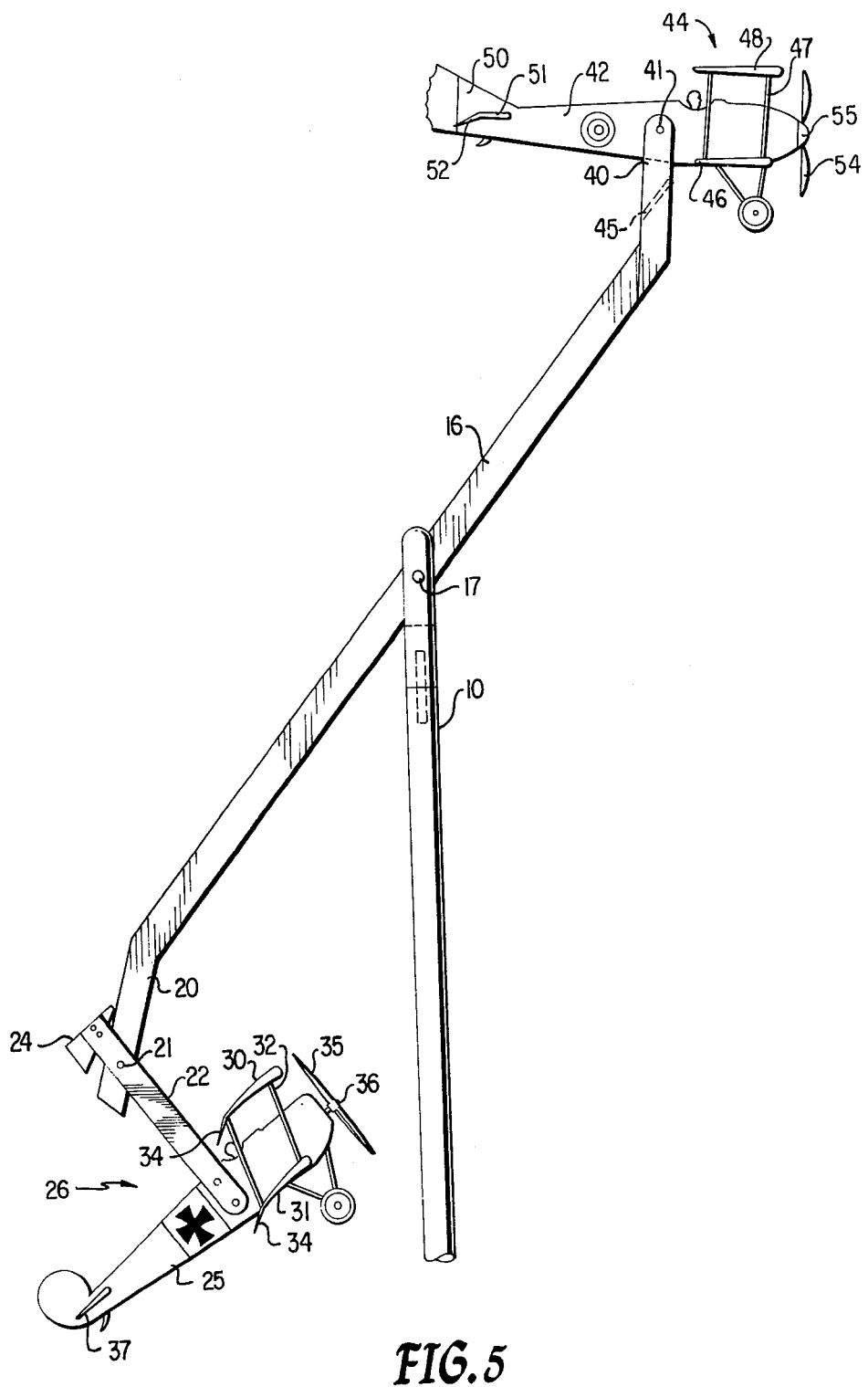
FIG. 5 shows the disposition of the device without relative wind.

Referring to FIG. 1, it will be noted that a support 10, which can be of any convenient length, extends vertically from the ground or is rigidly attached to a stationary structure so as to be disposed vertically as shown. A pivot 11 is connected to the support 10 by means of a pin 12 which permits pivot 11 freely to rotate 360° relative to the support 10. Pivot 11 is bifurcated to include a pair of extensions 14 and 15, as seen in FIG. 2, which carry between them a bar 16 on a horizontal bearing comprising a bolt 17 which extends between the extensions 14 and 15 and is perpendicular to bar 16. Bar 16 includes an after portion 20 which is inclined angularly downwardly relative to the remainder of the bar 16. A horizontal pin 21 is provided pivotably to connect after portion 20 to a depending arm 22, which extends on either side of the after portion 20 and is joined at the top by stop means 24 and at the bottom by the fuselage of a model aircraft designated generally by reference numeral 26.

Aircraft 26 is a biplane which includes wings 30 and 31 connected by spars 32 with ailerons 34 of wings 30 and 31 extending relatively downwardly to increase the drag and lift of aircraft 26. A propeller 35 is mounted on a rotatable hub 36 which is capable of being rotated by relative wind. Elevator 37 of aircraft 26 is horizontal or may be disposed with a rearward inclination 37a (as indicated in dot-dash lines) relative to the fuselage 25 and wings 30 and 31. Aircraft 26 thus tends to be urged counter-clockwise relative to bar 16 by relative wind directed as indicated by arrow 28 as seen in FIG. 1 about pin 21 due to the positive lift of the airfoils 30 and 31 and the negative lift effect of elevator 37, if inclined as elevator 37a. However stop means 24 limits the amount of such rotation in either direction.

The forward portion of bar 16 is bifurcated by the rigid attachment of a pair of projecting members 40. A pin 41 rotatably receives the fuselage 42 of the forward model aircraft 44 which also is a biplane. Insert 45 is secured between the projection members 40 to limit the amount of rotation which is possible by aircraft 44 about pin 41. It will be noted that the aircraft 44 includes wings 48 and 46, which are connected by spars 47, a rudder 50 which carries a stabilizer 51 including an elevator 52 extending therefrom in a lowered position so that the aircraft 44 is urged to rotate about pin 41 clockwise by relative wind movement in the direction of arrow 28 as seen in FIG. 1. As in aircraft 26, aircraft 44 includes a propeller 54 which is rotatably mounted on fuselage 42 by means of a hub 55.

Referring to FIG. 5, when there is little or no relative wind, the heavier after portion 20 of bar 16, including aircraft 26, causes bar 16 to be inclined downwardly to the rear and upwardly in the forward portion. Aircraft 26 depends from bar 16 through arm 22 and is biased somewhat upwardly due to the position of arm 22 established by stop means 24, the forward portion of which is in contact with the after portion 20 of bar 16. Forward aircraft 44 on the other hand is in a slightly inclined disposition due to the fact that the forward portion of aircraft 44 is somewhat heavier than the after portion and therefore causes the aircraft to pivot somewhat downwardly about pin 41.

Figure 6:
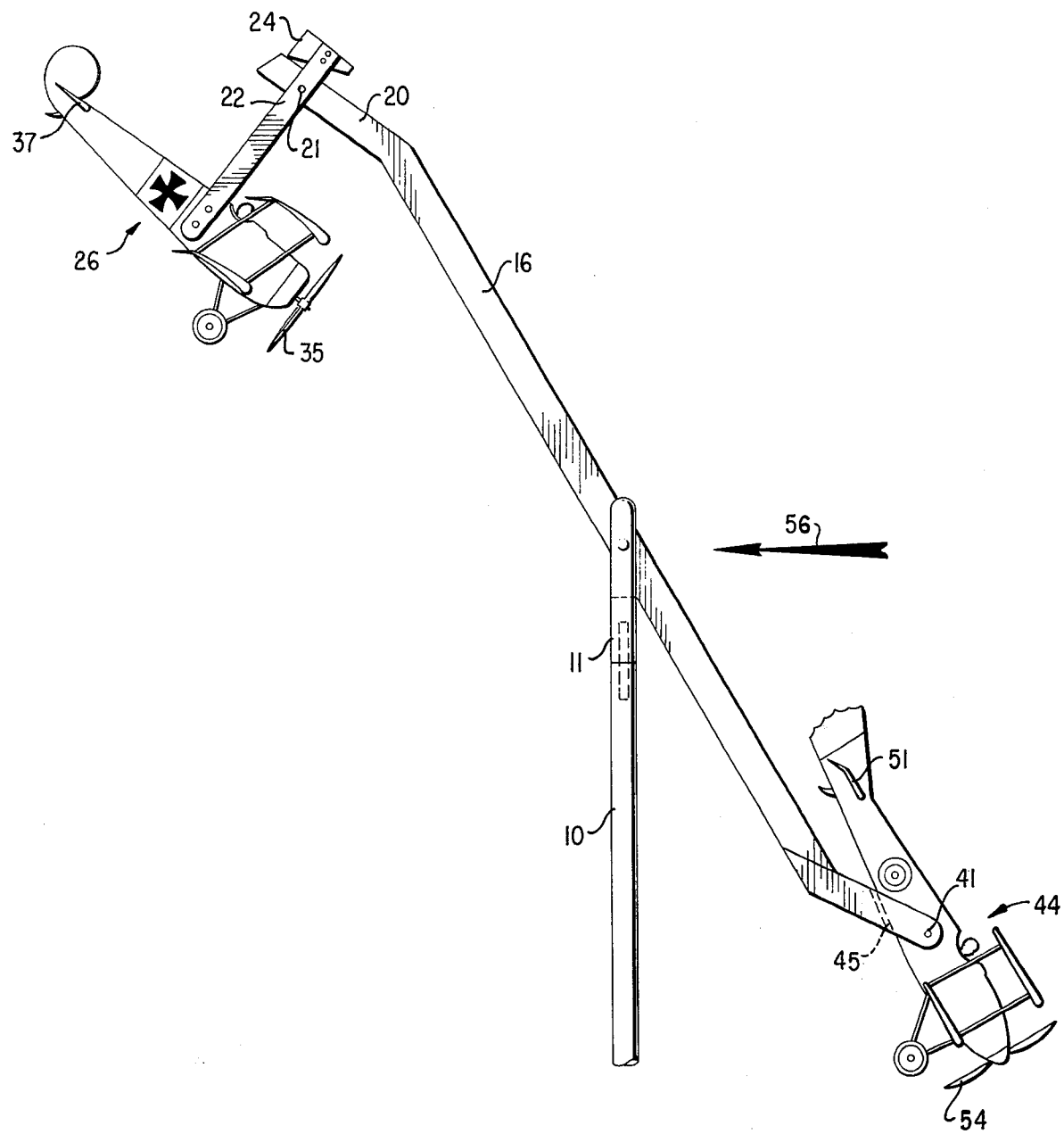
FIG. 6 shows the disposition of the device in a relative wind of high velocity.

As the relative wind increases, bar 16 is caused to rotate in clockwise direction with reference to FIG. 5 and, with a sufficient velocity of wind, eventually assumes the position as shown in FIG. 6. In such Figure, it will be noted that the aircraft 26 has rotated relatively in a small amount in a counterclockwise direction whereby the other end of the stop means 24 contacts the after portion 20 of bar 16 and is held in such position due primarily to the weight of aircraft 26. Aircraft 44 is also relatively displaced in a counter-clockwise direction, wherein its further rotation is blocked by the insert 45, due to the action of the wind against the stabilizer 51 which due to its distance from the pin 41 overcomes the forces on the forward portion of the aircraft tending to cause it to be displaced in a clockwise direction. Both aircraft 26 and 44 are headed into the relative wind, having a direction indicated by arrow 56, due to the greater drag of after aircraft 26 together with arm 22 and the disposition of aircraft. When the relative wind is of lesser force, it will be understood that bar 16 takes intermediate positions between that shown in FIG. 6 depending upon the particular relative velocity of the wind. Propellers 35 and 54 are caused to rotate by the wind.

In practice, the aircraft 26 and 44 have different colors so that an observer by noting the relative positions of aircrafts 44 and 26 and with knowledge of what velocity of wind is required to displace the aircraft to these relative positions in enabled to determine the approximate wind velocity and, moreover, whether the wind is steady or gusty by the steadiness or rocking of bar 16.

Having thus described my invention, what I claim as new and desire to secure by Letters Patent of the United States is:

1. Apparatus for indicating the relative velocity of the wind which comprises a generally vertically disposed support means, a turnable extension rotatably connected to the upper part of said support means, generally horizontal pivot means in said extension, a bar mounted on said pivot means at a place offset from its center of gravity whereby the effect of gravity on said bar urges it to be inclined relative to the horizontal with one side of said bar inclined upwardly from said pivot means and the other side of said bar inclined downwardly relative to said pivot means, each end of said bar being provided with mounting means turnable about a horizontal axis, a pair of airfoils mounted on said bar and extending outwardly therefrom, one of said airfoils being mounted on one of said mounting means at one end of said bar and the other of said airfoils being mounted on the other of said mounting means at the other end of said bar, said airfoils being freely turnable about their respective mounting means within limits and disposed whereby they cause said bar to be substantially aligned with the relative direction of the wind as seen in plan and to cause the side of said bar inclined downwardly by gravity to be lifted and the side of said bar inclined upwardly by gravity to be lowered as a function of the relative velocity of the wind so that with sufficient relative velocity of the wind said bar is inclined as seen in elevation opposite to its inclination as urged by gravity and is caused to rock in a vertical plane by variations in wind velocity due to gusts of wind.

2. Apparatus in accordance with claim 1, wherein said airfoils are included in a pair of model aircraft connected to said bar.

3. Apparatus in accordance with claim 2, wherein said aircraft are pivotally connected to said bar by horizontal axel means provided in said mounting means on said bar whereby the angle between said bar at rest and the longitudinal axis of the aircraft is variable.

4. Apparatus in accordance with claim 3, wherein at least one said aircraft depends from an arm pivotally connected from said bar.

5. Apparatus in accordance with claim 3, wherein stop means are provided to limit the pivotable movement of each said aircraft relative to said bar.

6. Apparatus in accordance with claim 1, wherein said support means comprises a handle whereby the apparatus can be supported manually.

7. Apparatus indicating the direction and relative velocity of the wind which comprises support means, a turnable extension rotatably connected to said support means, a generally horizontal pivot means in said extension, a bar mounted on said pivot means whereby said bar is urged to turn about said pivot means in a first direction, a first airfoil mounted on said bar on one side of said pivot means and a second airfoil mounted on said bar on the other side of said pivot means, said airfoils disposed at different inclinations relative to said bar whereby their combined reaction with a relative wind urges said bar to turn about said pivot means in a second direction opposite said first direction by an amount which is a function of the relative velocity of the wind acting on said airfoils.

8. Apparatus in accordance with claim 7, wherein said bar is urged to turn in said first direction by gravity.

9. Apparatus in accordance with claim 7, wherein at least one of said airfoils is included in a model aircraft connected to said bar, said aircraft being completely on one side of said pivot means.

10. Apparatus in accordance with claim 9, wherein the said other airfoil is included in a further model aircraft which is completely on the other side of said pivot means.

11. Apparatus for indicating the direction and relative velocity of the wind which comprises support means, a turnable member rotatably connected to said support means, pivot means in said turnable member afforded with a generally horizontal axis, a bar mounted on said pivot means whereby said bar is urged to turn about said pivot means in a first direction, mounting means on one side of said pivot means having a horizontal axis, an airfoil mounted on said, mounting means so as to be freely rotatable about said axis within limits, said airfoil providing lift in a relative wind whereby it causes said bar to turn about said pivot in a second direction opposite said first direction and become inclined downwardly into the relative wind by an amount which is a function of the relative wind acting on said airfoil, said airfoil also providing drag whereby it acts on said bar causing it selectively to rotate so that said airfoil is disposed generally behind said turnable member in the relative wind.

12. Apparatus in accordance with claim 11, wherein said first direction is a generally downward direction urged by the effects of gravity.

13. Apparatus for indicating the relative velocity of the wind which comprises support means, pivot means in said support means afforded with a generally horizontal axis, a bar mounted on said pivot means whereby said bar is urged to turn about said pivot means in a first direction, a first airfoil mounted on said bar on one side of said pivot means and a second airfoil mounted on said bar on the other side of said pivot means, said airfoils disposed relative to said bar whereby their reaction with a relative wind urges said bar to turn about said pivot means in a second direction opposite said first direction and to become downwardly inclined into the relative wind by an amount which is a function of the relative velocity of the wind acting on said airfoils.

14. Apparatus in accordance with claim 13 wherein said first direction is an generally downward direction urged by the effects of gravity.

15. Apparatus in accordance with claim 14 wherein at least one of said airfoils is included in a model aircraft connected to said bar, said aircraft being completely on one side of said pivot means.

16. Apparatus in accordance with claim 15, wherein said other airfoil is included in a further model aircraft which is completely on the other side of said pivot means.

17. Apparatus in accordance with claim 16 wherein said support means is rotatable about substantially vertical axis.

18. Apparatus which indicates the direction of the relative wind comprising support means, a bar turnably mounted on said support means whereby it is rotatable about a substantially vertical axis, and a pair of model aircraft mounted on said bar on each side of said support means, the airfoils included in said model aircraft causing said bar to be generally aligned with the relative direction of the wind at least one of said aircraft being freely pivotable at least within limits about a horizontal connection provided in its mountings on said bar whereby the vertical angle between said bar and said airfoil of said one aircraft is variable irrespective of said bar's position relative to the horizontal.

19. Apparatus in accordance with claim 18 wherein said bar is mounted on said support means whereby it is also turnable about a substantially horizontal axis.

* * * * *